United States Patent Office 3,804,877
Patented Apr. 16, 1974

---

3,804,877
2-ANILINOPHENYLACETONITRILES
Alfred Sallman, Bottmingen, and Rudolf Pfister, Basel, Switzerland, assignors to Ciba-Geigy Corporation, Ardsley, N.Y.
No Drawing. Division of application Ser. No. 77,763, Oct. 2, 1970, which is a continuation-in-part of application Ser. No. 861,571, Sept. 29, 1969, now Patent No. 3,558,690, which is a continuation-in-part of applications Ser. No. 625,326, Mar. 23, 1967, and Ser. No. 782,206 and Ser. No. 782,473, both Dec. 9, 1968, all now abandoned, application Ser. No. 782,206 being a continuation-in-part of said application Ser. No. 625,326 and abandoned application Ser. No. 539,829, Apr. 4, 1966. This application Aug. 23, 1972, Ser. No. 283,137
Claims priority, application Switzerland, Apr. 8, 1965, 4,961/65; Feb. 25, 1966, 2,770/66
Int. Cl. C07c 121/78
U.S. Cl. 260—465 D                    8 Claims

ABSTRACT OF THE DISCLOSURE

Substituted 2-anilinophenylacetonitriles, 2-anilinobenzyl alcohols and 2-anilinophenylglyoxylic acids are valuable chemical intermediates for the preparation of substituted 2-anilinophenylacetic acids and esters thereof. The 2-anilinophenylacetic acids and -phenylacetates have desirable absorption patterns for protecting the skin against the irritating effects of ultraviolet light and are also anti-inflammatory agents. The 2-anilinophenylacetonitriles are obtained from the 2-anilinobenzyl alcohols through formation of the intermediate 2-anilinobenzyl chlorides. The 2-anilinobenzyl alcohols are obtained from the corresponding N-phenyl anthranilic acid. The 2-anilinophenylglyoxylic acids are obtained from N-phenylanilines.

CROSS REFERENCE

This is a division of application Ser. No. 77,763 filed Oct. 2, 1970, which is a continuation-in-part of Ser. No. 861,571 filed Sept. 29, 1969, now U.S. Pat. No. 3,558,690, which is a continuation-in-part of applications Ser. Nos. 782,206, 782,473 and 625,326 filed Dec. 9, 1968, Dec. 9, 1968 and Mar. 23, 1967 respectively, all now abandoned, Ser. No. 782,206 itself being a continuation-in-part of said Ser. No. 625,326 and of Ser. No. 539,829, filed Apr. 4, 1966 and now abandoned.

The present invention pertains to various organic compounds which have industrial value as chemical intermediates. Specifically the present compounds are key intermediates in the synthesis of certain substituted 2-anilinophenylacetic acids which are the subject of our copending application Ser. No. 861,571. As is therein disclosed, the class of substituted 2-anilinophenylacetates defined by the formulas:

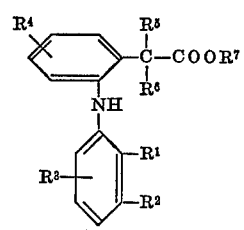

and

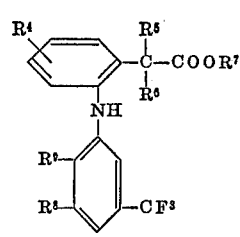

I(B)

wherein $R^1$ is (lower)alkyl, (lower)alkoxy, fluoro or chloro;
$R^2$ is hydrogen, (lower)alkyl, chloro or fluoro;
$R^3$ is hydrogen, (lower)alkyl, chloro or fluoro;
$R^4$ is hydrogen, (lower)alkyl, (lower)alkoxy, chloro, fluoro or bromo;
$R^5$ is hydrogen or (lower)alkyl;
$R^6$ is hydrogen, (lower)alkyl or when $R^5$ is hydrogen, benzyl;
$R^7$ is hydrogen, (lower)alkyl or benzyl;
$R^8$ is hydrogen or trifluoromethyl; and
$R^9$ is hydrogen or chloro, absorb the irritating rays of ultraviolet light which are primarily responsible for sunburn, those of a wavelength of about 290 to about 300–315 millimicrons, while at the same time they do not absorb the desirable so-called "tanning" rays of over 315 millimicrons wavelength and are therefore especially useful as ultraviolet absorbers for cosmetic purposes, e.g., in sun-tan creams or lotions. The compounds of Formulas I(A) and I(B) also posses anti-inflammatory, analgesic and antipyretic activity combined with a favorable therapeutic index, as is more fully described in Ser. No. 861,571.

In the present specification, the term (lower)alkyl denotes a straight or branched monovalent hydrocarbon chain of from 1 to 5 carbon atoms. The term (lower) alkoxy is defined as a (lower)alkyl connected through an ether oxygen link. Thus alkyl includes for example, methyl, ethyl, n-propyl, isopropyl, n-butyl, sec. butyl, and tert. butyl, preferably methyl or ethyl, while (lower) alkoxy includes for example, methoxy, ethoxy, n-propoxy, isopropoxy, n-butoxy and isobutoxy, preferably methyl or ethyl.

A first embodiment of the present invention pertains to a compound selected from the group consisting of 2-anilinophenylacetonitriles of the formulas:

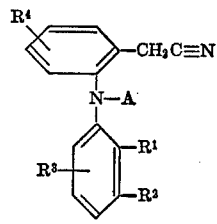

II(A)

and

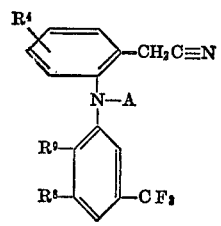

II(B)

wherein $R^1$ is (lower)alkyl, (lower)alkoxy, fluoro or chloro;
$R^2$ is hydrogen, (lower)alkyl, chloro or fluoro;

$R^3$ is hydrogen, (lower)alkyl, chloro or fluoro, provided that when $R^3$ is hydrogen, $R^1$ and $R^2$ are not the same;
$R^4$ is hydrogen, (lower)alkyl, (lower)alkoxy, chloro, fluoro or bromo;
$R^8$ is hydrogen or trifluoromethyl;
$R^9$ is hydrogen or chloro; and
A is hydrogen or (lower)alkanoyl.

To convert these 2-anilinophenylacetonitriles to the corresponding acids of Formula I(A) or I(B) wherein $R^5$ and $R^6$ are each hydrogen, they are treated with an alkali metal hydroxide in an aqueous solvent. Suitable solvents include aqueous lower alkanols such as ethanol, methanol or n-butanol, polyols such as ethylene glycol or dimethylformamide. The hydrolysis is performed at or slightly below the boiling temperature of the solvent, using at least two equivalents of an alkali metal hydroxide, in particular sodium or potassium hydroxide. In those cases wherein A is alkanoyl, e.g., acetyl, this can be hydrolyzed in the course of the basic nitrile hydrolysis.

These 2-anilinophenylacetonitriles where A is (lower)alkanoyl can also be converted into certain of the corresponding phenylacetates (Formula I(A) or I(B) where $R^7$ is (lower)alkyl) through treatment of the nitrile with a (lower)alkanol in the presence of an acid catalyst and subsequent removal of A through treatment with alkali metal hydroxide in an aqueous solvent.

Compounds of Formula I(A) and I(B) where $R^7$ is (lower)alkyl or benzyl, can be prepared from the corresponding acids by conventional esterification techniques.

Isolation and purification are accomplished via conventional techniques, e.g., extraction and recrystallization.

The groups $R^5$ or $R^6$, optionally present in the 2-anilinophenylacetic acids, can be introduced into these 2-anilinophenylacetonitriles wherein A is a (lower)alkanoyl group and $R^5$ and $R^6$ are hydrogen or into the final 2-(substituted aniline)phenylacetic acid bearing an N-alkanoyl group, through conventional alkylation techniques, with the N-alkanoyl group subsequently being removed by alkaline hydrolysis.

A preferred class of 2-anilinophenylacetonitriles are those as above defined wherein $R^1$ is methyl or chloro, each of $R^2$ and $R^3$ is hydrogen, methyl or chloro, $R^3$ being in the ortho position; $R^4$ is hydrogen and A is hydrogen, $R^8$ and $R^9$ being as previously defined.

The 2-anilinophenylacetonitriles are obtained in several steps from the corresponding 2-anilinobenzoic acids or their (lower)alkyl esters through reduction with lithium hydride in ether or tetrahydrofuran, sodium borohydride in methanol, or sodium borohydride and lithium bromide in diglyme (diethylene glycol dimethyl ether). Thus obtained are another class of valuable chemical intermediates, the substituted 2-anilinobenzyl alcohols of the formulas:

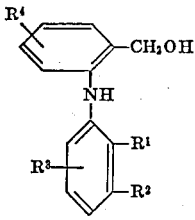

III(A)

and

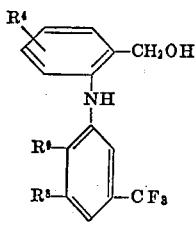

III(B)

wherein
$R^1$ is (lower)alkyl, (lower)alkoxy, fluoro or chloro;
$R^2$ is hydrogen, (lower)alkyl, chloro or fluoro;
$R^3$ is hydrogen, (lower)alkyl, chloro or fluoro, provided that when $R^3$ is hydrogen, $R^1$ and $R^2$ are not the same;
$R^4$ is hydrogen, (lower)alkyl, (lower)alkoxy, chloro, fluoro or bromo;
$R^8$ is hydrogen or trifluoromethyl; and
$R^9$ is hydrogen or chloro.

These 2-anilinobenzyl alcohols are useful as chemical intermediates in the preparation of the above 2-anilinophenylacetonitriles and consequently in the preparation of certain of the 2-anilinophenylacetic acids of Ser. No. 861,571 as well. Thus, upon treatment with acetyl chloride, with dry ethereal hydrogen chloride or with thionyl chloride and dry pyridine in ether, there is obtained the corresponding 2-anilinobenzyl chloride which is then in turn treated with sodium or potassium cyanide to yield the above described 2-anilinophenylacetonitriles.

A preferred class of 2-anilinobenzyl alcohols are those as defined above wherein $R^1$ is methyl or chloro, each of $R^2$ and $R^3$ is hydrogen, methyl or chloro, $R^3$ being in the ortho position, and $R^4$ is hydrogen, $R^8$ and $R^9$ being as previously defined.

The 2-anilinophenylacetic acids of Ser. No. 861,571 can also be obtained from 1-phenylindol-2,3-diones of the formulas:

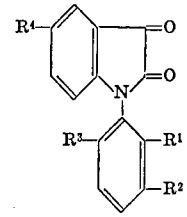

IV(A)

and

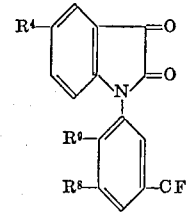

IV(B)

wherein
$R^1$ is (lower)alkyl, (lower)alkoxy, fluoro or chloro;
$R^2$ is hydrogen, (lower)alkyl, chloro or fluoro;
$R^3$ is hydrogen, (lower)alkoxy, chloro or fluoro, provided that when $R^3$ is hydrogen, $R^1$ and $R^3$ are not the same;
$R^4$ is hydrogen, (lower)alkyl, (lower)alkoxy, chloro, fluoro or bromo;
$R^8$ is hydrogen or trifluoromethyl; and
$R^9$ is hydrogen or chloro.

To thus obtain 2-anilinophenylacetic acids, a 1-phenylindole-2,3-dione of the above formulas is treated first with hydrazine or a semicarbazide and then with an alkali hydroxide or alkali metal alcoholate. This process is carried out by either first converting the substituted indole-2,3-dione with hydrazine, which can also be used in the form of the hydrate, or with semicarbazide to the corresponding 3-(hydrazone) or 3-(semicarbazone), respectively, and decomposing this intermediate with an alkali metal hydroxide or alkali metal alkoxides or by mixing and reacting all three reaction components simultaneously. The temperature for the main reaction, the action of the alkali metal hydroxide or alkali metal alkoxide, is in the range of 100–200°, preferably from 140–200°. The optional prior and separate formation of the hydrazone can be carried out at considerably lower temperatures, e.g., at room temperature; it can however also be conducted at higher temperatures. Water which may be introduced when the hydrazine hydrate is used or that which is liberated by the reaction, can be removed by distillation. A higher boiling organic solvent can be used as reaction medium. Such solvents include ethylene glycol (or mono- and di- ethers thereof such as diethylene glycol, diethylene glycol monomethylether) or triethylene glycol, higher boiling alcohols such as benzyl alcohol, octyl alcohol or nitrilotriethanol, or when the reaction is carried out in a closed vessel, a (lower)alkanol. It is also possible when employing a (lower)alkanol solvent such as ethanol or butanol as the initial reaction medium, to remove this solvent during the reaction together with excess hydrazine and liberated water until the reaction mixture gradually solidifies, reaching a temperature between 150° and 200°. The alkali metal hydroxides which can be used in this third process are, in particular, potassium or sodium hydroxide. The alkali metal alkoxides include sodium alkoxide and either derivatives of (lower)alkanol solvent or of the higher boiling hydroxy compounds used as reaction media.

The alkali metal salts of substituted phenylacetic acids of Formula I(A) or I(B) that are first obtained according to the process are optionally converted into the free acid in the usual manner using strong acids, e.g., hydrochloric acid. If desired, the acid obtained is converted into another salt, preferably a pharmaceutically acceptable salt, with an inorganic or organic base, according to processes mentioned hereinbefore.

In converting the ring-substituted indol-2,3-diones of Formula IV(A) or IV(B) into the corresponding 2-anilinophenylacetic acids, the process can be carried out through an additional intermediate stage, namely the production of the valuable class of 2-(substituted anilino)phenylglyoxylic acid characterized by the following formulas:

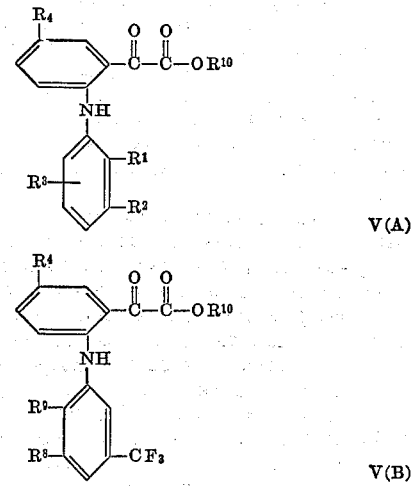

wherein $R^1$ is (lower)alkyl, (lower)alkoxy, fluoro or chloro;
$R^2$ is hydrogen, (lower)alkyl, chloro or fluoro;
$R^3$ is hydrogen, (lower)alkyl, chloro or fluoro, provided that when $R^3$ is hydrogen, $R^1$ and $R^2$ are not the same;
$R^4$ is hydrogen, (lower)alkyl, (lower)alkoxy, chloro, fluoro or bromo;
$R^8$ is hydrogen or trifluoromethyl;
$R^9$ is hydrogen or chloro; and
$R^{10}$ is hydrogen or a cation.

Thus the 1-phenylindol-2,3-dione is initially subjected to hydrolysis as with sodium hydroxide and 2-(substituted anilino)phenylglyoxylic acid or its salt is then reduced with hydrazine or semicarbazide and with an alkali metal hydroxide or alkali metal alkoxide as previously described.

To obtain these 1-phenylindol-2,3-diones, a substituted N-phenylaniline, obtained for example as previously described, is treated with oxalyl chloride to yield a substituted N-phenyl oxanilic acid of the formula:

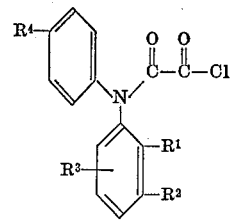

or of the formula

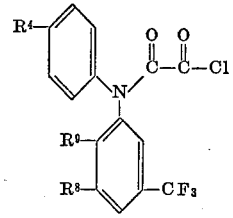

wherein $R^1$, $R^2$, $R^3$, $R^4$, $R^8$ and $R^9$ are as previously defined for the compounds of Formulas V(A) and (B).

These oxanilic acid chlorides are then converted to the 1-phenylindol-2,3-diones through the use of aluminum chloride, the reaction being conducted at room temperature.

A preferred class of 2-anilinophenylglyoxylic acids are those as defined above wherein $R^1$ is methyl or chloro, each of $R^2$ and $R^3$ is hydrogen, methyl or chloro, $R^3$ being in the ortho position, and $R^4$ is hydrogen, $R^8$ and $R^9$ being as previously defined.

The following examples set forth the manner and process of making typical embodiments of the invention, without being a limitation thereof, and include the best mode contemplated by the inventors for carrying out the invention. In these examples, temperatures are expressed on the centigrade scale.

EXAMPLE 1

2-(3-trifluoromethylanilino)benzyl alcohol

To a solution of 3.8 g. of sodium borohydride in 160 ml. of anhydrous diglyme are added 8.7 g. of lithium bromide. The mixture is stirred for half an hour at room temperature. A solution of 14.8 g. of methyl 2-(3-trifluoromethylanilino)benzoate [alternatively named as N-($\alpha,\alpha,\alpha$-trifluoro-m-tolyl)anthranilic acid methyl ester] in 40 ml. of anhydrous diglyme is added dropwise. The whole is then heated for 3 hours at 100°, cooled and poured onto a mixture of 300 g. of ice and 30 ml. of concentrated hydrochloric acid. After stirring for a short time, the oil which separates is extracted with 300 ml. of ethyl acetate. The ethyl acetate solution is washed with 2 N potassium bicarbonate solution and water, dried over sodium sulphate and concentrated at 40° under 11 torr. The residue is distilled on a short Vigreux column to yield 2-(3-trifluoromethylanilino)benzyl alcohol [Alternatively named as o-($\alpha,\alpha,\alpha$-trifluoro-m-toluidino)benzyl alcohol] which boils at 27–129°/0.001 torr. The yield is 75% of the theoretical.

Alternatively, 9.97 g. of lithium aluminum hydride are suspended in 100 ml. of absolute ether and the suspension is cooled to 5° with stirring. A solution of 36.8 g. of methyl 2-(3 - trifluoromethylanilino)benzoate in 140 ml. of absolute ether is slowly added dropwise, the addition being made under an atmosphere of nitrogen with external cooling. The mixture is then stirred for 18 hours at room temperature. Ten milliliters of water, 10 ml. of 15% sodium hydroxide solution and another 30 ml. of water are added dropwise to the stirred mixture which has been cooled to 0°. The whole is stirred for 1 hour at room temperature and then filtered. The filtrate is concentrated at 40° under 11 torr. The residue is fractionated by means of a short Vigreux column to yield 2-(3-trifluoromethylanilino)benzyl alcohol.

In a similar fashion are obtained:

(a) 2-(2,3-dimethylanilino)benzyl alcohol, B.P. 136–141°/0.005 torr,
(b) 2-(2-methoxy-5-methylanilino)benzyl alcohol, M.P. 138–139° from methanol,
(c) 2-(2-chloro-5-trifluoromethylanilino)benzyl alcohol, M.P. 100–101° from petroleum ether,
(d) 2-(2,6-dichloroanilino)-5-methoxybenzyl alcohol, M.P. 112–113° from cyclohexane.

Sodium borohydride can also be used in the foregoing reduction.

As a third alternative method, the free benzoic acid can be reduced with lithium aluminum hydride. Thus a suspension of 65 g. of 2-(2,6-dichloroanilino)benzoic acid in 500 ml. of absolute tetrahydrofuran is added dropwise at 5–15° to 30 g. of lithium aluminum hydride in 150 ml. of absolute tetrahydrofuran. The reaction mixture is stirred for 15 hours under reflux whereupon, at 0–5°, 30 ml. of water, 30 ml. of 15% sodium hydroxide solution and 90 ml. of water are carefully added dropwise. After adding 200 ml. of tetrahydrofuran, the organic solution is removed from the crystalline precipitate by filtration under suction and the latter is well washed with tetrahydrofuran.

The combined solutions are concentrated, taken up in ethyl acetate and washed with 2 N sodium carbonate solution and saturated sodium chloride solution. Concentration of the organic phase yields 44.4 g. of an oil which is crystallized from etheyl ether/petroleum ether to yield 2-(2,6-dichloroanilino)benzyl alcohol (Compound E), M.P. 110–112°.

In a similar fashion is obtained:

(f) 2-(2-methyl-3-chloroanilino)benzyl alcohol, M.P. 51–52° from ethyl ether/petroleum ether,
(g) 2-(2,6-dichloro-3-methylanilino)benzyl alcohol, M.P. 144–145° from ethyl ether/petroleum ether.

EXAMPLE 2

N-acetyl-2-(3-trifluoromethylanilino)benzyl chloride

A solution of 23 g. of 2-(3-trifluoromethylanilino)benzyl alcohol in 70 ml. of acetyl chloride is refluxed for 1 hour under an atmosphere of nitrogen. The orange colored solution is then concentrated at a bath temperature of 40° under 11 torr. The residue is dissolved in 150 ml. of ethyl acetate/ether 1:1. The organic phase is washed with 20 ml. of 2 N potassium bicarbonate solution and 20 ml. of water, dried over sodium sulfate and concentrated in vacuo. A pale oil remains which is crystallized from ether/petroleum ether. The product [which is alternatively named as α-chloro N-(α,α,α-trifluoro-m-tolyl)aceto-o-toluidide] melts at 83–85°.

Similarly obtained is N-acetyl-2-(2-methoxy-5-methylanilino)benzyl chloride, M.P. 121–123° from petroleum ether.

EXAMPLE 3

N-acetyl-2-(3-trifluoromethylanilino)phenylacetonitrile

A solution of 11.6 g. of N-acetyl-2-(3-trifluoromethylanilino)benzyl chloride in 60 ml. of dimethyl sulfoxide is added within 10 minutes to a suspension of 2.2 g. of sodium cyanide in 20 ml. of dimethyl sulfoxide, the addition being made at 40° while stirring. The temperature should not exceed 40° during the addition. The mixture is stirred for 3 hours at 40°, cooled to 10° and diluted with 200 ml. of water. The solution is extracted four times with 150 ml. of ethyl acetate. The ethyl acetate solutions are then shaken with 200 ml. of 6 N hydrochloric acid and then with 30 ml. of water, dried over sodium sulfate and concentrated at 40° under 11 torr. The product [alternatively named as α-cyano-N-(α,α,α-trifluoro-m-tolyl)-aceto-o-toluidide] remains as a yellow oil which can be used directly.

Similarly obtained is N-acetyl-2-(2-methoxy-5-methylanilino)phenylacetonitrile, M.P. 108–109° from cyclohexane.

The use of these compounds can be exemplified by the following procedure.

Nine and one-half grams of N-acetyl-2-(3-trifluoromethylanilino)phenylacetonitrile are dissolved in 100 ml. of ethanol and 90 ml. of 1 N sodium hydroxide solution. The solution is refluxed overnight. It is cooled and concentrated to about 70 ml. at 40° under 11 torr. The aqueous alkaline solution is extracted with 50 ml. of ether, this ether solution is separated and the aqueous phase is acidified with 2 N hydrochloric acid. The acid solution is extracted with 50 ml. of ether, the ether extract is washed with water, the ether solution is dried over sodium sulfate and concentrated under 11 torr without heating. The residue is crystallized from ether/petroleum ether. After recrystallization from ether/petroleum ether, 2-(3-trifluoromethylanilino)phenylacetic acid [alternatively named as o-(α,α,α - trifluoro-m - toluidino)phenylacetic acid] melts at 112–114°. The yield is 35% of theoretical.

Alternatively, this product can be prepared by the following procedure:

A solution of 50 g. of N-acetyl-2-(3-trifluoromethylanilino)phenylacetonitrile in 550 ml. of absolute ether and 375 ml. of absolute ethanol is cooled to 0–5° while stirring and excluding moisture. Dry hydrogen chloride is introduced into the solution for 4 hours, during which the temperature should not exceed 5°. Hydrogen chloride is then introduced for another 5 hours at room temperature. The solution is then left to stand overnight at room temperature after which it is evaporated to dryness at a bath temperature of 40° under 11 torr. The residue is dissolved in 140 ml. of water, the solution is covered with 150 ml. of ether and the whole is refluxed for 2 hours on a steam bath. It is then cooled, the ether phase is removed and the aqueous solution is again extracted with 200 ml. of ether. The combined ether solutions are dried over sodium sulfate and evaporated at 40° under water jet vacuum. The residue is fractionated by means of a Vigreux column under high vacuum. Ethyl N-acetyl-2-(3-trifluoromethylanilino)phenylacetate boils at 110–115°/0.001 torr.

Similarly obtained is ethyl N-acetyl-2-(2-methoxy-5-methylanilino)phenylacetate, B.P. 130–135°/0.001 torr.

A solution of 16.4 g. of ethyl N-acetyl-2-(3-trifluoromethylanilino)phenylacetate in 225 ml. of 95% ethanol and 67 ml. of 2 N sodium hydroxide solution is refluxed for 16 hours. The ethanol is then distilled off at 40° under 11 torr and the aqueous solution which remains is extracted with 40 ml. of ether. The ethereal phase is separated, the aqueous phase is cooled to 0–5° by the addition of ice and acidified to pH 6 with 2 N hydrochloric acid. The oil which separates out is dissolved in 200 ml. of ether, the ethereal solution is washed with 20 ml. of water and dried over sodium sulfate. It is then concentrated under 11 torr without warming. On adding petroleum ether, 2-(3-trifluoromethylanilino)phenylacetic acid crystallizes, M.P. 112–114°.

Similarly prepared is 2-(2-methoxy-5-methylanilino)phenylacetic acid, M.P. 98–99° from ether.

EXAMPLE 4

2-(2-chloro-5-trifluoromethylanilino)phenylacetonitrile (A) 2-(2-chloro-5-trifluoromethylanilino)benzyl chloride.—A solution of 20 g. of 2-(2-chloro-5-trifluoromethylanilino)benzyl alcohol [prepared as in Example 1(c)] in 70 ml. of acetyl chloride is refluxed for 16 hours under an atmosphere of nitrogen. The solution is then concentrated at about 40° under reduced pressure. The residue is taken up in 40 ml. of benzene and again concentrated.

The residue is then taken up in 200 ml. of ether, the ethereal solution is washed with 2 N sodium carbonate solution and water, dried over sodium sulfate and the solvent is evaporated off under reduced pressure. The oil which remains is distilled under high vacuum, B.P. 120°/0.001 torr. The 2-(2-chloro-5-trifluoromethylanilino)benzyl chloride can be crystallized from petroleum ether, M.P. 50–51°. The yield is 32% of theoretical.

Alternatively, 150 ml. of 5 N absolute ethereal hydrogen chloride are added dropwise to a stirred solution of 5 g. of 2-(2,3-dimethylanilino)benzyl alcohol in 150 ml. of absolute ether. Crystals precipitate and are dissolved by addition of 400 ml. of absolute ether. The solution is stirred for 30 minutes at room temperature and is evaporated at 40° and 11 mm. Hg. The residue is triturated with ether whereupon it crystallizes. The crystals are filtered and treated with a mixture of 20 ml. of water and 100 ml. of ether. The ether phase is separated, extracted with water, dried over soidum sulfate and evaporated under reduced pressure to yield 2-(2,3-dimethylanilino)benzyl chloride, 2-(2-methyl-3-chloroanilino)benzyl chloride is obtained in an analogous fashion.

Similarly from the benzyl alcohol prepared in Example 1(d), there is obtained:

(d) 2-(2,6-dichloroanilino)-5 - methoxybenzyl chloride, M.P. 82–84° from petroleum ether.

Alternatively, a solution of 37.5 g. of 2-(2,6-dichloroanilino)benzyl alcohol in 560 ml. of absolute ether and 56 ml. of absolute pyridine is quickly added dropwise at 0–5° to a solution of 56 ml. of thionyl chloride and 56 ml. of pentane. The mixture is stirred for 30 minutes at 0°. Ice is added and the mixture successively extracted with 100 ml. of 2 N hydrochloric acid, 100 ml. of 2 N sodium hydroxide solution and 100 ml. of water. The organic phase is then filtered to remove insoluble constituents. The filtrate is dried over potassium carbonate and evaporated to dryness under 11 torr.

2-(2,6-dichloloanilino)benzyl chloride remains as a yellow oil and can be used without further purification.

Similarly prepared is 2-(2,6-dichloro-3-methylanilino)benzyl chloride.

(B) 2-(2-chloro-5-trifluoromethylanilino)phenylacetonitrile. A suspension of 6 g. of sodium cyanide in 120 ml. of dimethyl sulfoxide is heated to 40°. Then a solution of 33 g. of 2-(2-chloro-5-trifluoromethylanilino)benzyl chloride in 150 ml. of dimethyl sulfoxide is added while stirring, during which addition the temperature should not rise above 40°. The mixture is stirred for 3 hours at 40° and then diluted with 600 ml. of water. The solution is then extracted three times with 1000 ml. of ethyl acetate each time. The combined extracts are washed with 100 ml. of 6 N hydrochloric acid and with 100 ml. of water, dried over sodium sulfate and the solvent is distilled off under reduced pressure. The 2-(2-chloro-5-trifluoromethylanilino)phenylacetonitrile boils at 122–126°/0.01 torr and can be crystallized from petroleum ether. After recrystallization it melts at 58–59°. The yield is 74% of theoretical.

Similarly obtained are:

(d) 2-(2,6-dichloroanilino)-5-methoxyphenylacetonitrile, M.P. 169–171°

(e) 2-(2,6-dichloroanilino)phenylacetonitrile, M.P. 71–72° from ethyl ether/petroleum ether.

Similarly from 2-(2-methyl-3 - chloroanilino)benzyl chloride, 2-(2,3-dimethylanilino)benzyl chloride and 2-(2,6-dichloro-3-methylanilino)benzyl chloride, there are obtained:

(f) 2-(2-methyl-3-chloroanilino)phenylacetonitrile, M.P. 86–88°

(g) 2-(2,3-dimethylanilino)phenylacetonitrile, M.P. 95–96°

(h) 2-(2,6-dichloro-3-methylanilino)phenylacetonitrile, M.P. 98–99° from ethanol.

The use of these intermediates can be exemplified as follows:

A solution of 18.4 g. of 2-(2-chloro-5-trifluoromethylanilino)phenylacetonitrile in 120 ml. of 1 N sodium hydroxide solution and 120 ml. of ethanol is refluxed for 10 hours. The volume of the reaction solution is then reduced at 40° under reduced pressure to about 80 ml. and the aqueous solution is extractted with 100 ml. of ether. The aqueous-alkaline phase is then acidified at 5° with 2 N hydrochloric acid and the oil which separates is taken up in ether. The ether solution is removed, washed with water, dried over sodium sulfate and, without heating, is concentrated under reduced pressure. On adding petroleum ether, the product 2-(2-chloro-5-trifluoromethylanilino)phenylacetic acid [which may be alternatively named as o-(3-trifluoromethyl-6-chloroanilino)phenylacetic acid] crystallizes out, M.P. 94–96°; yield 55% of theoretical.

Alternatively, a solution of 2 g. of 2-(2,3-dimethylanilino)phenylacetonitrile and 3 g. potassium hydroxide in 60 ml. of butanol is refluxed for 3 hours. The solution is then concentrated at 60° under 0.1 torr. The residue is taken up in 100 ml. of water and the aqueous solution is washed with ether and acidified with 2 N hydrochloric acid. The oil which precipitates is extracted with ether. The ethereal solution is washed to neutrality with water, dried over magnesium sulfate and evaporated under 11 torr. The residue is crystallized from ethyl ether/petroleum ether to yield 2-(2,3-dimethylanilino)phenylacetic acid, M.P. 112–113°.

Similarly prepared are (d) 2-(2,6-dichloroanilino)-5-methoxyphenylacetic acid, M.P. 134–136° from ethyl ether/petroleum ether (e) 2-(2,6-dichloroanilino)phenylacetic acid, M.P. 156–158° from ethyl ether/petroleum ether (f) 2-(2-methyl-3-chloroanilino)phenylacetic acid, M.P. 124–125°

(h) 2-(2,6-dichloro-3 - methylanilino)phenylacetic acid, M.P. 146–149° from ether/petroleum ether.

EXAMPLE 5

1-(2,6-dimethylphenyl)indol-2,3-dione (A) 2-(2,6-dimethylanilino)benzoic acid.—A mixture consisting of 525 g. of o-chlorobenzoic acid and 195 g. of 85% potassium hydroxide in 1500 ml. of n-pentanol is heated, while stirring, to 160°. About 400 ml. of n-pentanol are distilled off within 30 minutes. One kilogram of 2,6-xylidine and 12.5 g. of copper powder are then added and the mixture is refluxed for 15 hours. The mixture is then cooled and poured into a solution of 180 g. of sodium carbonate in 600 ml. of water and the solution distilled with steam. After the excess 2,6-xylidine has been distilled off, the aqueous residue is filtered over Hyflo and the filtrate acidified with concentrated hydrochloric acid. The percipitated crystals are filtered off and recrystallized from ethanol-water to yield 460 g. of 2-(2,6-dimethylanilino)benzoic acid, M.P. 205–208°. The yield is 57%.

The following are similarly obtained:

(a) 2-(2-chloro-3 - trifluoromethylanilino)benzoic acid, M.P. 183–185°

(b) 2-(2-chloro-6-methylanilino)benzoic acid, M.P. 216–217°

(c) 2-(2,6-dichloroanilino)benzoic acid, M.P. 212–213°

(d) 2-(2,6-dichloro-3-methylanilino)benzoic acid, M.P. 247–249°

(e) 2-(2-methoxy-5-methylanilino)benzoic acid, M.P. 141–142°

(f) 2-(2,6-dimethylanilino)-5-methylbenzoic acid, M.P. 220–225°.

(B) N-phenyl-2,6-dimethylaniline.—Three hundred and seventy grams of 2-(2,6-dimethylanilino)benzoic acid are heated for 2½ hours to 280°. The cooled melt is dissolved in 1500 ml. of ether. The ether solution is washed twice with 300 ml. of 2 N sodium carbonate solution and 300 ml. of water. The ether solution is separated, then dried over sodium sulfate and concentrated to dryness under 11 torr. at 40°. The residue is distilled, whereby the N-phenyl-2,6-xylidine is obtained as a yellow oil, B.P. 125°/0.01 torr. The distillate is crystallized from petroleum ether to yield 230 g. of the product [alternatively named as N-phenyl-2,6-xylidine], M.P. 52–54°.

Similarly obtained are (a) N-phenyl-2-chloro-5-trifluoromethylaniline, B.P. 85–88°/0.001 torr
(b) N-phenyl-2-chloro-6-methylaniline, B.P. 88°/0.05 torr
(c) N-phenyl-2,6-dichloroaniline, B.P. 109–111°/0.003 torr
(d) N-phenyl-2,6-dichloro-3-methylaniline, B.P. 115–120°/0.001 torr
(e) N-phenyl-2-methoxy-5-methylaniline, B.P. 122°/0.001 torr
(f) N-(1-methylphenyl)-2,6-dimethylaniline, B.P. 115–120°/0.001 torr (C) N-phenyl-2,6 - dimethyloxaniloyl chloride.—One hundred sixty two milliliters of oxalyl chloride are slowly added dropwise at 5° to a solution of 101 g. of N-phenyl-2,6-dimethylaniline in 650 ml. of anhydrous benzene. The suspension is then stirred for 2 hours at room temperature and for ½ hour at 50°, whereby the suspension goes into solution. The reaction solution is cooled and evaporated to dryness under 11 torr with a bath temperature of 40°. The residue is crystallized from benzene/petroleum ether. N-phenyl-2,6-dimethyloxaniloyl chloride melts at 78–80°. The yield is 87% of theoretical value.

The following are analogously produced:

(a) N-phenyl - 2-chloro-5-trifluoromethyloxaniloyl chloride (oil)
(b) N-phenyl-2-chloro-6-methyloxaniloyl chloride (oil)
(c) N-phenyl-2,6-dichlorooxaniloyl chloride, M.P. 107–109° (from ether/petroleum ether)
(d) N-phenyl - 2,6-dichloro-3-methyloxaniloyl chloride, M.P. 103–105° (from ether/petroleum ether)
(e) N-phenyl-2-methoxy-5-methyloxaniloyl chloride (oil)
(f) 4N-(4-methylphenyl)-2,6-dimethyloxaniloyl chloride (oil)

(D) 1-(2,6-dimethylphenyl)indol-2,3-dione.—To a solution of 124 g. of N-phenyl-2,6-dimethyloxaniloyl chloride in 900 ml. of tetrachloroethane are added in portions of 58.6 g. of pulverized aluminum chloride. The mixture is stirred for 48 hours at room temperature. It is then poured onto a mixture of 100 g. of ice and 200 ml. of 2 N hydrochloric acid. Five hundred milliliters of chloroform are added and the mixture is well shaken. The tetrachloroethane/chloroform solution is separated and washed first with 300 ml. of 2 N sodium carbonate solution and subsequently with 300 ml. of water. It is dried over sodium sulfate and concentrated to dryness under 0.1 torr. The residue is crystallized from ether/petroleum ether to yield the product [alternatively named as 1-(2,6-xylyl)indol-2,3-dione] which melts at 157–159°. The yield is 95% of theoretical value.

Similarly obtained are:

(a) 1 - (2-chloro-5-trifluoromethylphenyl)indol-2,3-dione, M.P. 134–136° (from ethyl ether)
(b) 1 - (2 - chloro-6-methylphenyl)indol-2,3-dione, M.P. 163–165° (from ethyl ether)
(c) 1 - (2,6 - dichlorophenyl)indol-2,3-dione, M.P. 175–176° (from ethanol)
(d) 1 - (2,6 - dichloro-3-methylphenyl)indol-2,3-dione, M.P. 162–165° (from ethanol)
(e) 1 - (2-methoxy-5-methylphenyl)indol-2,3-dione, M.P. 168–169° (from ethyl acetate)
(f) 1 - (2,6 - dimethylphenyl)-5-methylindol-2,3-dione, M.P. 158° (from ethyl ether)

The use of these 1-phenylindol-2,3-diones as intermediates may be typified as follows:

To a solution of 3 g. of 1-(2,6-dimethylphenyl)indol-2,3-dione in 20 ml. of diethylene glycol monomethyl ether are added 1.56 g. of hydrazine hydrate. After 15 minutes, 1.34 g. of pulverized potassium hydroxide are added. The solution is slowly heated to 150° in an oil bath and then heating at this temperature is continued for one hour. The solution is then cooled and poured onto ice. The ether solution is separated and extracted twice with 2 N sodium carbonate solution. The sodium carbonate solutions are combined and acidified with 2 N hydrochloric acid. The oil which precipitates is extracted with ether. The ether solution is washed with water, dried over sodium sulfate and concentrated at 40° under 11 torr. The residue is crystallized twice from ether/petroleum ether. The product. 2-(2,6-dimethylanilino)phenylacetic acid [alternatively named as o-(2,6-xylidino)phenylacetic acid], melts at 120–127° with decomposition.

Similarly prepared are (c) 2 - (2,6-dichloroanilino)phenylacetic acid, M.P. 156–158° from ethyl ether/petroleum ether
(e) 2 - (2 - methoxy-5-methylanilino)phenylacetic acid, M.P. 98–99° from ethyl ether/petroleum ether
(f) 2 - (2,6 - dimethylanilino)-5-methylphenylacetic acid, M.P. 88–89° from ethyl acetate/petroleum ether Alternatively, a solution consisting of 7.3 g. of 1-(2,6-dimethylphenyl)indol-2,3-dione, 15 ml. of 2 N sodium hydroxide solution and 100 ml. of ethanol is refluxed for 15 hours. The solution is then cooled and concentrated to dryness under 11 torr at 40°. The residue is dissolved in 200 ml. of water. The aqueous solution is extracted with ether, separated and acidified by adding 2 N hydrochloric acid. The yellow crystals which precipitates are dissolved in ether. The ether solution is separated, extracted with water, dried over sodium sulfate and concentrated under 11 torr at 40°. The residue is crystallized from ether/petroleum ether to yield 2-(2,6-dimethylanilino)phenylglyoxylic acid, M.P. 135–137°.

Similarly from 1 - (2-chloro-5-trifluoromethylphenyl)indol - 2,3-dione [see Example 5D (a)], 1-(2-chloro-6-methylphenyl)indol-2,3-dione [see Example 5D(b)], 1-(2,6-dichloro-3-methylphenyl)indol-2,3-dione [see Example 5D(d)] and 1-(2,6-dimethylphenyl)-5-methylindol-2,3-dione [see Example 5D(f)] are prepared:

(a) 2-(2-chloro-5-trifluoromethylanilino)phenylglyoxylic acid
(b) 2- (2-chloro-6-methylanilino)phenylglyoxylic acid
(d) 2 - (2,6 - dichloro-3-methylanilino)phenylglyoxylic acid, M.P. 153–158° from ether
(e) 2 - (2,6 - dimethylanilino)-5-methylphenylglyoxylic acid, M.P. 127° from ethyl acetate/petroleum ether.

To a solution of 1.5 g. of 2-(2,6-dimethylanilino)-phenylglyoxylic acid in 10 ml. of anhydrous ethanol are added 2.25 g. of hydrazine hydrate. After the solution has cooled again to room temperature, a solution of 2.25 g. of sodium in 55 ml. of anhydrous ethanol is added. The mixture is slowly heated to 200°, whereby ethanol, water and hydrazine evaporate, leaving a crystalline residue which is kept at 200° for 15 minutes longer, then cooled. The residue is dissolved in 20 ml. of water; the solution is filtered through Hyflo and rendered acid with 2 N hydrochloric acid. The oil which precipitates is dissolved in ether. The ether solution is washed with 2 N potassium carbonate solution and water, the aqueous alkaline solution is separated and acidified with 2 N hydrochloric acid. The oil which precipitates is extracted with ether. The ether solution is washed with water, dried over sodium sulfate and concentrated under 11 torr at 40°. The residue is crystallized twice from ether/petroleum ether to yield the product, 2 - (2,6-dimethylanilino)phenylacetic acid, M.P. 120–127° (dec.).

Similarly obtained are:

(a) 2-(2-chloro-5-trifluoromethylanilino)phenylacetic acid, M.P. 94–96° from ethyl ether/petroleum ether
(b) 2-(2-chloro-6-methylanilino)phenylacetic acid, M.P. 140–147° from ether
(d) 2-(2,6-dichloro-3-methylanilino)phenylacetic acid
(e) 2-(2,6-dimethylanilino)-5-methylphenylacetic acid, M.P. 88–89° from ethyl acetate/petroleum ether.

EXAMPLE 6

1-[3,5-bis(trifluoromethyl)phenyl]indol-2,3-dione (A) 2-[3,5-bis(trifluoromethyl)anilino]benzoic acid.—A mixture of 710 g. of o-chlorobenzoic acid and 298 g. of 85% potassium hydroxide in 2500 ml. of n-pentanol is heated with stirring to 160° (bath temperature). During 30 minutes approximately 1000 ml. of n-pentanol are distilled off. To this mixture is then added 1560 g. of 3,5-bis(trifluoromethyl)aniline and 17 g. of copper powder are then added and the mixture is refluxed for 15 hours. After cooling, the mixture is poured into a solution of 244 g. of sodium carbonate in 2000 ml. of water. The resulting solution is distilled with steam. After the excess 2,5-bis-(trifluoromethyl)aniline has been removed by distillation, active charcoal is added to the aqueous solution, which is then filtered over Hyflo. The filtrate is acidified with concentrated hydrochloric acid. The crystals which precipitate are removed by filtration and slurried in 10 liters of hot water, then filtered and the filter residue is crystallized from ethanol to yield the intermediate [alternatively named as N - ($\alpha,\alpha,\alpha,\alpha',\alpha',\alpha'$-hexafluoro-3,5-xylyl)-anthranilic acid] which melts at 195–197°.

(B) N-Phenyl - 3,5 - bis(trifluoromethyl)aniline.—One hundred grams of 2-[3,5-bis(trifluoromethyl)anilino]benzoic acid are heated for one hour to 280°. The cooled melt is dissolved in 500 ml. of ether. The ether solution is extracted twice with 200 ml. of 2 N potassium bicarbonate solution and 50 ml. of water. The ether solution is then separated by filtration, dried over sodium sulfate and concentrated to dryness under 11 torr. The residue is distilled to yield the intermediate [alternatively named as $\alpha,\alpha,\alpha,\alpha',\alpha',\alpha'$-hexafluoro-N-phenyl-3,5-xylidine] as a yellow oil, B.P. 89–91°/0.001 torr. Upon standing, the oil crystallized, 82–83°.

(C) N-Phenyl-3,5-bis(trifluoromethyl)oxaniloyl chloride.—One hundred thirteen milliliters of oxalyl chloride are added dropwise at 5° during 1 hour to a solution of 72 g. of N-phenyl-3,5-bis(trifluoromethyl)aniline in 450 ml. of anhydrous benzene. The solution is then stirred for 40 minutes at 50–60°. The reaction solution is cooled to room temperature and concentrated to dryness under 11 torr and with a bath temperature of 40°. The residue is dissolved in 250 ml. of anhydrous benzene and the solution again concentrated to dryness under 11 torr. The N-phenyl-3,5-bis(trifluoromethyl)oxaniloyl chloride remains as an orange-colored oil.

(D) 1 - [3,5 - bis(trifluoromethyl)phenyl]indol-2,3-dione.—To a solution of 97 g. of N-phenyl-3,5-bis(trifluoromethyl)oxaniloyl chloride in 930 ml. of anhydrous tetrachloroethane are added in 33.4 g. of pulverized aluminum chloride. The mixture is then stirred for 20 hours at room temperature. The reaction mixture is then poured onto a mixture of 500 g. of ice and 500 ml. of 2 N hydrochloric acid and well shaken. The tetrachloroethane solution is separated, shaken with 200 ml. of water and then with 200 ml. of 2 N carbonate solution, dried over sodium sulfate and concentrated by evaporation under 11 torr with a bath temperature of 70°. The residue is crystallized from ethanol. The product [alternatively named as 1-($\alpha,\alpha,\alpha,\alpha',\alpha',\alpha'$-hexafluoro-3,5-xylyl)indol - 2,3-dione] melts at 118–119°.

The use of this intermediate may be illustrated as follows:

Eight grams of hydrazine hydrate are added at 50° to a solution of 7.2 g. of 1-[3,5-bis(trifluoromethyl)phenyl]-indol-2,3-dione in 30 ml. of ethanol. The yellow solution is then cooled to room temperature and a sodium ethoxide solution prepared from 8 g. of sodium and 80 ml. of aqueous ethanol is added. The solvent is slowly distilled off with the introduction of dry nitrogen and with a bath temperature of 100°. The bath temperature is slowly increased to 130° and the solvent completely distilled off. The crystalline residue is dissolved in 300 ml. of water. The aqueous solution is extracted with ether, separated and acidified with 2 N hydrochloric acid. The obtained oil is extracted with ether. The ether extract is washed with water, dried over sodium sulfate and concentrated to dryness at room temperature under 11 torr. The residue is crystallized from ether/petroleum ether. The product, 2 - [3,5-bis(trifluoromethyl)anilino]phenylacetic acid, [alternatively named as o-($\alpha,\alpha,\alpha,\alpha',\alpha',\alpha'$-hexafluoro-3,5-xylidino)phenylacetic acid], melts at 124–129° with decomposition.

The crystalline sodium salt of 2-[3,5-bis(trifluoromethyl)anilinophenyl]acetic acid is obtained by reacting an ethanolic solution of the acid with an equimolar amount of 2 N sodium hydride evaporating to dryness and recrystallizing from dioxane.

Alternatively 2 - [3,5-bis(trifluoromethyl)anilino]phenylacetic acid can be obtained from 1-[3,5-bis(trifluoromethyl)phenyl]-indol-2,3-dione though production of the intermediate 2 - [3,5-bis(trifluoromethyl)anilino]phenylglyoxylic acid according to the alternative synthesis of Example 5D.

What is claimed is:

1. A compound selected from the group consisting of 2-anilinophenylacetonitriles of the formulas:

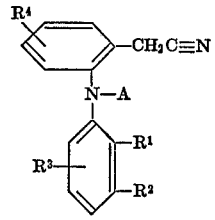

and

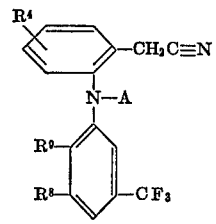

wherein $R^1$ is (lower)alkyl, (lower)alkoxy, fluoro or chloro;
$R^2$ is hydrogen, (lower)alkyl, chloro or fluoro;
$R^3$ is hydrogen, (lower)alkyl, chloro or fluoro, provided that when $R^3$ is hydrogen, $R^1$ and $R^2$ are not the same;
$R^4$ is hydrogen, (lower)alkyl, (lower)alkoxy, chloro, fluoro or bromo;
$R_8$ is hydrogen or trifluoromethyl;
$R_9$ is hydrogen or chloro; and
A is hydrogen or (lower)alkanoyl.

2. A compound according to claim 1, said compound being selected from the group consisting of 2-anilinophenylacetonitriles of the formulas:

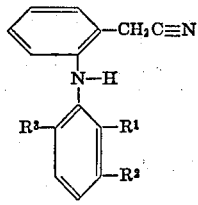

and

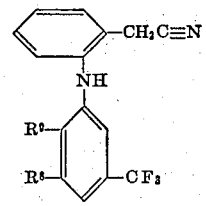

wherein
R$^1$ is methyl or chloro;
R$^2$ is hydrogen, methyl or chloro;
R$^3$ is hydrogen, methyl or chloro provided that when R$^3$ is hydrogen, R$^1$ and R$^2$ are not the same;
R$^8$ is hydrogen or trifluoromethyl; and
R$^9$ is hydrogen or chloro.

3. The compound according to claim 1 which is 2-(2,6-dichloroanilino)phenylacetonitrile.
4. The compound according to claim 1 which is 2-(2,6-dichloroanilino)-5-methoxyphenylacetonitrile.
5. The compound according to claim 1 which is 2-(2-methyl-3-chloroanilino)phenylacetonitrile.
6. The compound according to claim 1 which is 2-(2,6-dichloro-3-methylanilino)phenylacetonitrile.
7. The compound according to claim 1 which is 2-(2-chloro-5-trifluoromethylanilino)phenylacetonitrile.
8. The compound according to claim 1 which is N-acetyl-2-(3-trifluoromethylanilino)phenylacetonitrile.

References Cited
UNITED STATES PATENTS
3,369,042  2/1968  Scherrer _____ 260—465 R OTHER REFERENCES
Juby et al., J. Med. Chem., vol. 11, pp. 111–116 (1968).

ELBERT L. ROBERTS, Primary Examiner
D. H. TORRENCE, Assistant Examiner

U.S. Cl. X.R.
260—465 E